United States Patent [19]

Atkins

[11] Patent Number: 4,886,322

[45] Date of Patent: Dec. 12, 1989

[54] VEHICLE ANTI-LOCK BRAKE SYSTEM

[75] Inventor: Thomas M. Atkins, Ann Arbor, Mich.

[73] Assignee: Kelsey Hayes Company, Romulus, Mich.

[21] Appl. No.: 283,360

[22] Filed: Dec. 13, 1988

Related U.S. Application Data

[63] Continuation-in-part of Ser. No. 63,361, Jun. 15, 1987, Pat. No. 4,790,607, which is a continuation-in-part of Ser. No. 702,765, Feb. 19, 1985, Pat. No. 4,673,226.

[51] Int. Cl.$^4$ .............................................. B60T 8/66
[52] U.S. Cl. .................... 303/109; 188/181 R; 303/96; 303/97; 303/100; 303/106; 303/108; 303/110; 303/119; 364/426.02
[58] Field of Search .................... 303/95–99, 303/100, 102–110, 119, 61, 68–69, DIG. 3, DIG. 4; 188/181 A, 181 R, 181 C, 181 T; 364/426.02, 426.03

[56] References Cited

U.S. PATENT DOCUMENTS

| | | | |
|---|---|---|---|
| 3,514,160 | 5/1970 | Leiber | 303/119 |
| 3,515,440 | 6/1970 | Every et al. | 303/115 |
| 3,521,934 | 7/1970 | Leiber | 303/119 |
| 3,540,780 | 11/1970 | Okamoto et al. | 303/106 |
| 3,550,966 | 12/1970 | Leiber | 303/119 |
| 3,617,098 | 11/1971 | Leiber | 303/119 |
| 3,630,579 | 12/1971 | Rodi | 188/181 A |
| 3,731,979 | 5/1973 | Mikaila | 303/DIG. 4 |
| 3,761,140 | 9/1973 | Lewis et al. | 303/114 |
| 3,850,480 | 11/1974 | Atkins | 303/106 |
| 3,857,613 | 12/1974 | Arikawa | 303/109 |
| 3,870,376 | 3/1975 | Riordan | 303/92 |
| 3,880,474 | 4/1975 | Schariack | 303/106 X |
| 3,953,080 | 4/1976 | Brenner | 303/106 |
| 3,975,060 | 8/1976 | Hirayama | 188/349 X |
| 3,981,543 | 9/1976 | Atkins | 303/115 X |
| 4,036,537 | 7/1977 | Fleagle | 303/106 |
| 4,073,542 | 2/1978 | Yabuta et al. | 188/349 X |
| 4,077,675 | 3/1978 | Leiber et al. | 303/106 |
| 4,085,978 | 4/1978 | Nogami | 188/349 X |
| 4,091,348 | 5/1978 | Kawanoto et al. | 335/277 X |
| 4,418,966 | 12/1983 | Hattwig | 303/100 |
| 4,435,021 | 3/1984 | Hoenick | 303/119 X |
| 4,462,642 | 7/1984 | Leiber | 303/DIG. 4 |
| 4,466,671 | 8/1984 | Miyasaka | 303/973 |
| 4,515,343 | 5/1985 | Pischinger et al. | 251/129.15 X |
| 4,523,792 | 6/1985 | Belart et al. | 303/100 X |
| 4,531,708 | 7/1985 | Livet | 251/129.15 X |
| 4,532,951 | 8/1985 | Fermanich | 251/129.15 X |
| 4,552,372 | 6/1985 | Yano et al. | 251/129.15 |
| 4,561,701 | 12/1985 | Fujii et al. | 303/119 |
| 4,668,023 | 5/1987 | Every et al. | 303/100 |
| 4,673,226 | 6/1987 | Every et al. | 303/109 |
| 4,790,607 | 12/1988 | Atkins | 303/109 |

FOREIGN PATENT DOCUMENTS 2106605 4/1983 United Kingdom ............... 303/119

Primary Examiner—Douglas C. Butler

[57] ABSTRACT

The present invention concerns a vehicle anti-lock brake control system which does not require the use of an auxiliary hydraulic pump and, in the preferred embodiment, is adapted to control only the rear brakes of a four-wheel vehicle. The control system includes a normally open solenoid actuated isolation valve connected between the master cylinder and the rear wheel brakes, and a normally closed solenoid actuated dump valve connected between the rear wheel brakes and a fluid accumulator. A computer control is connected to monitor the rear wheel speed and deceleration and, during braking of the vehicle, functions to control the application of hydraulic pressure to the rear brakes via the isolation and dump valves in order to correct wheel speed departures and prevent lock-up of the brakes. The computer control is adapted to detect a low to high mu road surface change which occurs during a wheel speed departure, and thereafter applies additional pressure to the rear brakes by selectively opening the isolation valve. Further, the control is adapted to detect when one of the rear wheels remains locked after anti-lock measures have been taken. In these instances, the standard operating parameters which control the reapplication of additional pressure are modified.

13 Claims, 4 Drawing Sheets

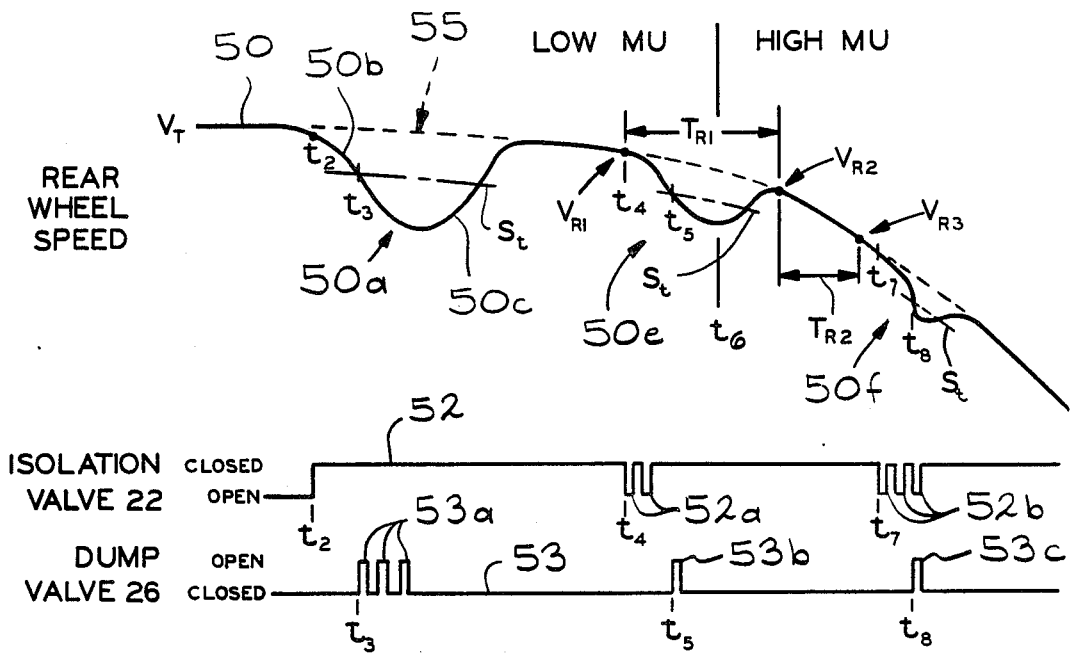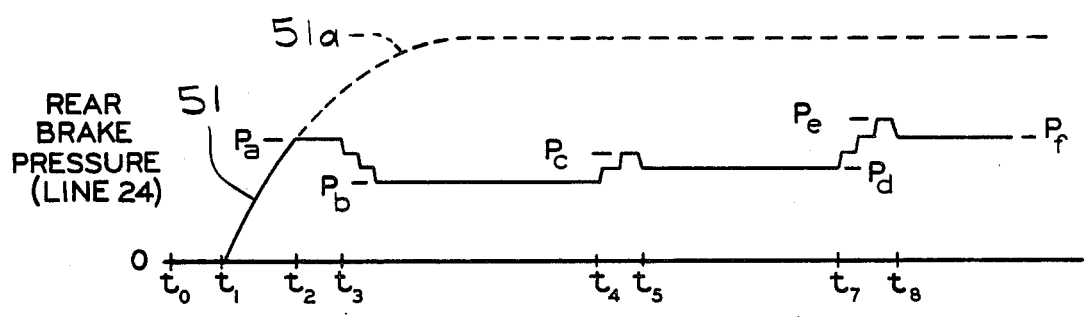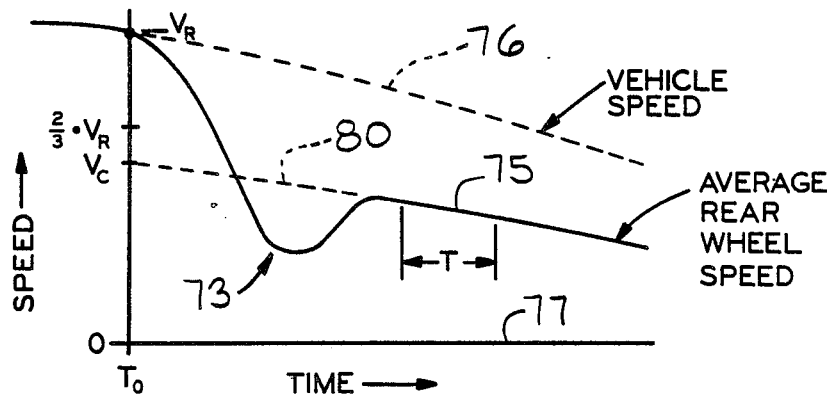
FIG. 2A
FIG. 2B

VEHICLE ANTI-LOCK BRAKE SYSTEM

CROSS-REFERENCE TO RELATED APPLICATION

This application is a continuation-in-part of U.S. Pat. Application Ser. No. 063,361 filed June 15, 1987, now U.S. Pat. No. 4,790,607, which is a continuation-in-part of U.S. Pat. Application Ser. No. 702,765, filed Feb. 19, 1985, now U.S. Pat. No. 4,673,226, entitled VEHICLE SKID CONTROL SYSTEM and assigned to the assignee of the present invention, both of which are herein incorporated by reference.

BACKGROUND OF THE INVENTION

This invention relates generally to vehicle anti-lock brake systems and, more particularly, to an anti-lock brake system which does not require the use of an auxiliary hydraulic pump and which is operative to selectively control the application of hydraulic fluid pressure to selected brakes to prevent locking of the associated wheels.

Braking a vehicle in a controlled manner under adverse conditions such as rain, snow, or ice generally requires precise application of the brakes by the vehicle driver. Under these conditions, or in panic stop situations, a driver will often apply excessive brake pressure, thus causing the wheels to lock such that excessive slippage between the wheels and the road surface takes place. Wheel lock-up conditions can lead to loss of directional stability and, possibly, uncontrolled vehicle spinout.

In a continuing effort to improve the operational safety of vehicles, many companies have been involved in the development of anti-lock braking systems. While typically such systems are adapted to control the braking of each braked wheel of a vehicle, some systems have been developed for controlling the braking of only a portion of the braked wheels. Examples of prior art anti-lock brake systems are disclosed in U.S. Pat. Nos. 3,515,440; 3,731,979; 3,870,376; and 3,880,474.

Generally, prior art anti-lock brake systems include a central control unit for monitoring the speed and deceleration of the controlled wheels. When the brakes of the vehicle are applied and the control unit senses an impending wheel lock-up condition, the central control unit functions to control the application of hydraulic pressure through a control valve means to the associated brakes to prevent lock-up of the controlled wheels. Typically, the anti-lock brake system includes means for cyclically relieving and reapplying pressure to the associated brakes to limit wheel slippage to a safe level while continuing to produce adequate brake torque to decelerate the vehicle as desired by the driver. In these systems, the means for reapplying pressure is generally a separate hydraulic power source. An example of an anti-lock brake system which does not require the use of a separate hydraulic pump is disclosed in U.S. Pat. No. 4,418,966.

Despite the tremendous advantages an anti-lock brake system can provide in stopping a vehicle in a controlled manner under adverse braking conditions, few vehicles are actually provided with such control systems. One of the chief reasons for this is that the control units and associated valving of such systems are somewhat sophisticated and expensive, and are therefore typically only found on more expensive vehicles.

SUMMARY OF THE INVENTION

The present invention concerns improved control features for an anti-lock vehicle brake control system which does not require the use of a separate hydraulic pump and, in the preferred embodiment, is utilized to only control the braking pressure to the rear wheels of a four-wheel vehicle. The anti-lock brake system monitors the rear wheel speed and deceleration and, during the braking of the vehicle, functions to control the application of hydraulic pressure to the vehicle rear brakes via an anti-lock control valve in order to prevent lock-up of the associated wheels. When excessive rear wheel deceleration is detected during a vehicle stop, this indicates that a first wheel speed departure has occurred and that the rear wheels are approaching an impending lock-up condition. The control then closes an isolation valve to hold pressure to the rear brakes at a relatively constant level. If, after the isolation valve has been closed, the difference between the rear wheel speed and a calculated theoretical speed ramp value exceeds a predetermined slip threshold, and the rear wheel deceleration exceeds a predetermined amount, a dump valve can be selectively opened to reduce pressure to the rear brakes and correct the first wheel speed departure.

After the first wheel speed departure cycle, and depending on the various operating parameters monitored by the system, the control can enter a selected one of several separate reapply modes to apply additional pressure to the rear brakes by selectively opening the isolation valve. Five such separate reapply modes are disclosed in above-identified U.S. Pat. Application Ser. No. 063,361. Since the anti-lock control system of the present invention does not utilize a separate hydraulic pump, the instances wherein additional pressure is to be supplied to the rear brakes must be carefully monitored and controlled, since the supply of pressurized fluid which can be used to increase pressure is very limited as compared to systems which utilize a separate pump.

The present application is specifically concerned with several improvements to the system disclosed in above-identified U.S. Pat. Application Ser. No. 063,361. In particular, the control of the present invention is operable to detect a low to high mu road surface change which occurs during a wheel speed departure of the controlled wheels. In accordance with the present invention, the control means is first operable to determine a reference deceleration value representing the average wheel deceleration during the wheel speed departure cycle. Next, after the wheel speed departure has been corrected, the control means is operable to determine the average wheel deceleration over a predetermined time period commencing at the end of the departure cycle. If this wheel deceleration is greater than the referenced deceleration by a predetermined amount, this indicates a change in road surface conditions from a low mu surface to a higher mu surface during the departure cycle. The increase in deceleration is a result of the additional braking provided by the front wheels when the vehicle travels onto the higher mu surface, which wheels are either uncontrolled or under control of a separate anti-lock system. In these instances, the pressure to the rear brakes can generally be increased to provide further braking without causing lock-up of the brakes. This is accomplished by momentarily opening the isolation valve.

The present invention also concerns a means for detecting when one of the two rear wheels remains fully or partially locked after anti-lock control measures have been taken to correct a wheel speed departure. Such a situation can occur either on a low mu surface or a split (high/low) mu surface. After this anti-lock control has attempted to correct a wheel speed departure, and the control means determines that at least one of the controlled wheel brakes remains at least partially locked, the control means is operable to modify the predetermined set of operating parameters which normally control the reapplication of additional pressure to the brakes. These parameters are modified to eliminate or reduce the normal reapplication of pressure.

The above, as well as the other features and advantages of the present invention, will become readily apparent to one skilled in the art from reading the following detailed description in conjunction with the attached drawings.

BRIEF DESCRIPTION OF THE DRAWINGS

FIGS. 2a and 2b waveform diagrams generally illustrating the improved operation of the anti-lock brake system in two different braking situations.

DESCRIPTION OF THE PREFERRED EMBODIMENT

It should be noted at the outset of this description that, while the control system is described herein for use with an anti-lock brake system which is adapted to control only the rear wheels of a four-wheel vehicle, the control system (or portions thereof) can also be used in four-wheel anti-lock brake systems.

Figure 1:
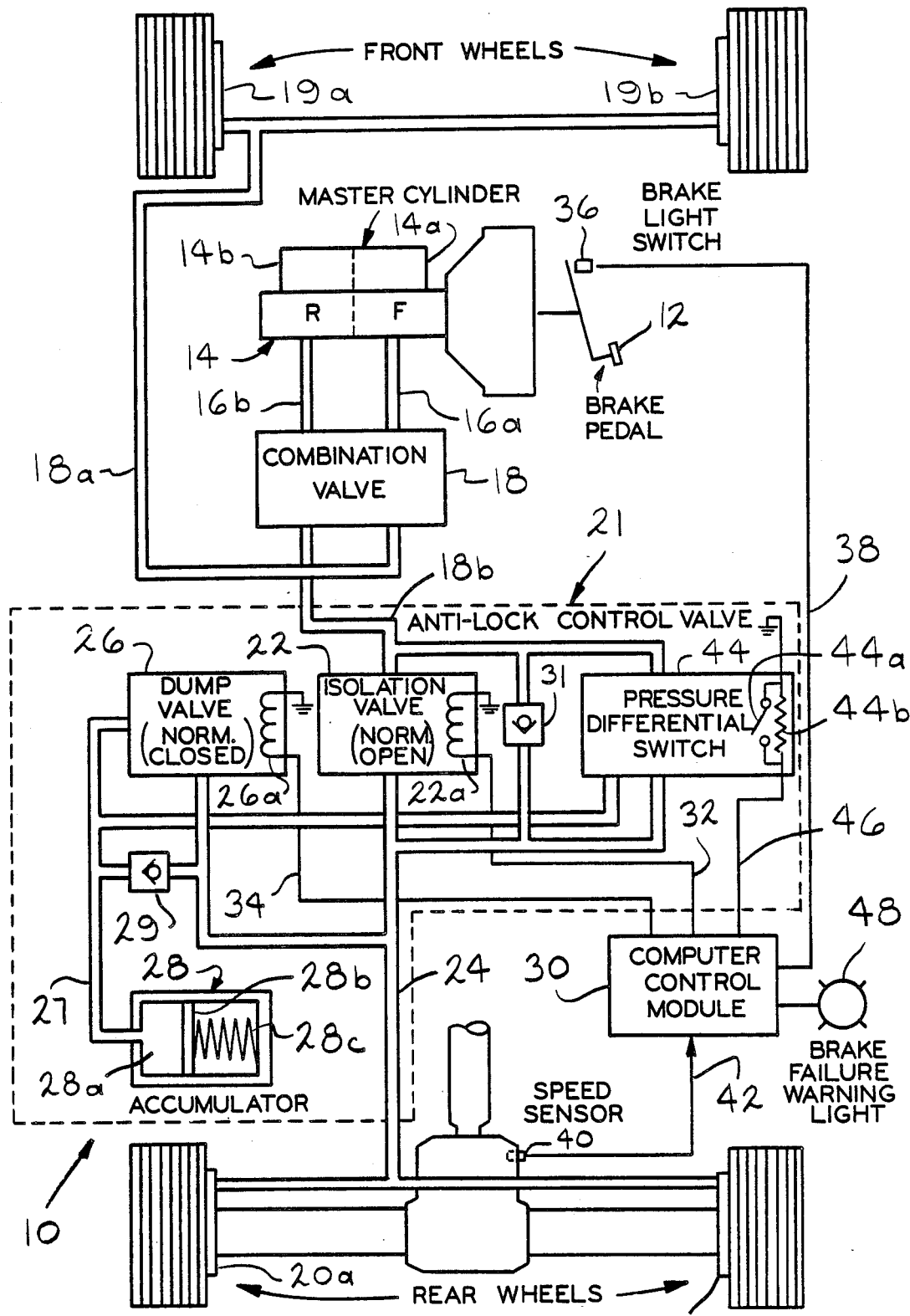
FIG. 1 is a schematic diagram illustrating a vehicle anti-lock brake system which utilizes control features of the present invention.

With reference to the drawings, FIG. 1 shows a schematic diagram of a vehicle anti-lock brake system 10 which incorporates the control features the present invention. The anti-lock brake system 10 is specifically adapted to monitor and control the braking of a predetermined number of wheels of a multi-wheeled vehicle having at least one braked wheel which is not controlled by the anti-lock control system. For example, as illustrated in FIG. 1, the anti-lock brake system can be utilized to control the braking of the rear wheels of a four-wheel vehicle wherein the front brakes of the vehicle are not controlled by the anti-lock brake system. Such a system is especially desirable for a vehicle such as a small truck, for example, wherein the weight supported by the rear wheels can vary greatly due to the wide range of payloads the truck may be transporting, and the proportioning between front/rear brake pressure can be difficult to control.

As shown in FIG. 1, the anti-lock brake system is installed on a vehicle having a hydraulic braking system consisting of a brake pedal 12 coupled to operate a dual reservoir master cylinder 14. When the vehicle operator depresses the brake pedal 12, the master cylinder 14 supplies hydraulic fluid under pressure from a front reservoir 14a through a hydraulic line 16a and from a rear reservoir 14b through hydraulic line 16b to a conventional combination or proportioning valve 18. The combination or proportioning valve 18 includes a first output line 18a adapted to supply hydraulic fluid at a first predetermined pressure to actuate the vehicle front brakes 19a and 19b and a second output line 18b which supplies fluid at a second predetermined pressure to actuate the vehicle rear brakes 20a and 20b. While not shown in the drawings, the combination valve 18 is typically provided with an integral differential pressure switch for detecting a predetermined pressure difference between the fluid in the lines 16a and 16b, which difference is indicative of a partial brake failure.

The anti-lock system utilizes a control valve 21 to selectively control the application of pressure to the rear brakes 20a and 20b when the system is in the anti-lock mode. The valve 21 can be of the type disclosed in U.S. Pat. Nos. 4,668,023 and 4,673,226, both of which are herein incorporated by reference. More specifically, the control valve 21 includes a normally open isolation valve 22 connected between the line 18b and a line 24 which supplies the pressurized brake fluid to the rear brakes 20a and 20b. As will be discussed, the isolation valve 22 is solenoid operated and is closed in the event impending rear wheel lock-up is detected to hold the pressure in the line 24 at a relatively constant level and thus prevent any further increase in pressure in the line 18b from being supplied to line 24.

Also, the valve 21 includes a normally closed dump valve 26 connected between the line 24 and a line 27 which is connected to a fluid accumulator 28. The accumulator 28 includes a variable volume fluid reservoir 28a for containing hydraulic fluid which is maintained at a slightly elevated pressure by a slideable piston 28b biased by a spring 28c. More specifically, the spring 28c maintains the fluid in the accumulator at a pressure slightly above the non-actuated pressure of the fluid in the line 24. As will be discussed, when the isolation valve 22 has been closed and the pressure held in the line 24 continues to cause excessive slippage of the rear wheels, the dump valve 26 is selectively opened to direct fluid into the accumulator 28 to reduce the pressure in the line 24 and prevent lock-up of the rear brakes. After the brake pedal 12 has been released, the isolation valve 22 is opened and the pressurized fluid in the accumulator 28 can be returned to the line 24 through a check valve 29. Alternatively, the check valve 29 can be eliminated and the dump valve 26 can be momentarily opened after the brake pedal is released to return fluid in the accumulator 28 to the line 24. A check valve 31 is connected across the isolation valve 22 between the lines 18b and 24 and provides for fluid flow from the line 24 to the line 18a when the pressure in the line 24 is greater than the pressure in the line 18b. Thus, when the brake pedal is released and the isolation valve is opened, higher pressure in the line 24 can flow to the line 18b through both the open isolation valve 22 and the check valve 31.

The operation of the isolation valve 22 and the dump valve 26 is controlled by a computer control module 30. The isolation valve 22 and the dump valve 26 are solenoid operated valves having solenoids 22a and 26a which can be connected to the computer control module by means of electric lines 32 and 34 respectively. In order to determine whether the vehicle operator is in the process of braking the vehicle, the computer control 30 is connected to a brake light switch 36 by a line 38 to monitor whether the brake pedal 12 is depressed. The computer control module 30 is also connected by a line 42 to a speed single sensor 40 which monitors the average speed of the vehicle rear wheels by sensing the rotation of the rear differential ring gear (not shown).

In addition to monitoring the position of the brake pedal 12 via the brake light switch 36 and the rear wheel speed via the speed sensor 40, the computer control module 30 is connected to a differential pressure switch 44 by a line 46. The switch 44 provides two separate functions. First, when the system is operating in the anti-lock mode, the switch 44 is used to monitor the differential pressure across the isolation valve. Secondly, when the system is not in the anti-lock mode and the vehicle is in a normal braking mode, the switch 44 is used to monitor the condition of the dump valve.

To perform its first function, the differential pressure switch 44 is coupled to monitor the pressure difference between the fluid in the lines 18b and 24 and is adapted to close contacts 44a to ground the line 46 when the pressure in the line 18b is greater than the pressure in the line 24. When the system is in the anti-lock mode and the differential pressure switch contacts 44a are closed, this indicates that the isolation valve has closed and that the pressure in the line 18b is greater than the pressure in the line 24 and, when the switch contacts 44a are open, this indicates that the pressure in the line 18b is equal to or has dropped below the pressure in the line In instances wherein the contacts 44a have closed, and have subsequently opened while the brake light switch 36 has remained actuated, this indicates a situation wherein the operator has initially applied a relatively heavy braking effort to the brake pedal to cause the system to enter an anti-lock mode and close the isolation valve to prevent lock-up of the rear wheels and, subsequently, has reduced braking effort to the pedal without necessarily completely releasing the pedal. It is in this situation that it is desirable to release the anti-lock mode and return the braking system to the normal operating mode. Thus, if the system is in the anti-lock mode and the computer control 30 senses that the differential pressure switch contacts 44a have at one point closed, but are now opened, and the brake pedal is still depressed, the system will return to the normal braking mode. Typically, there is some hysteresis associated with the operation of the differential pressure switch 44 such that the switch contacts 44a do not chatter between a closed and open position when the pressure in the line 18b remains relatively equal to the pressure in the line 24.

When the brake system is not operating in the anti-lock mode, the differential switch 44 is connected to check the valve seat condition of the dump valve 26 by monitoring the fluid pressure in the accumulator 28. At this time, the accumulator 28 should be empty, and the normally closed dump valve 26 should prevent pressurized fluid in the line 24 from being supplied to the accumulator. However, in the event fluid leaks past the dump valve seat into the accumulator, the pressure increase in the line 27 will be detected by the switch 44, which closes the switch contacts 44a to signal the control 30 of a potentially defective dump valve.

As shown in FIG. 1, the differential switch 44 can be provided with an integral resistor 44b connected in parallel with the switch contacts 44a. The resistor 44b typically has a relatively high resistance value, such as 10K ohms. The resistor 44b enables the computer control module 30 to check the continuity of the line 46 when system is not in the anti-lock mode and the contacts 44a are open. In these instances, the line 46 should provide a signal path to ground through the resistor 44b. The control module 30 is connected to a brake failure warning light 48 which is activated in the event a failure in the anti-lock brake system is detected.

Basically, the anti-lock brake system of the present invention monitors the rear wheel speed and deceleration and, during braking of the vehicle, functions to control the application of hydraulic pressure to the vehicle rear brakes via the control valve 21 in order to prevent a lock-up condition of the brakes. In the event excessive rear wheel deceleration is detected, indicating that a wheel speed departure has occurred and that the rear brakes are approaching a lock-up condition, the control module 30 closes the isolation valve 22 to hold the pressure in the line 24 at a relatively constant level. If, after the isolation valve 22 has been closed, the difference between the actual rear wheel speed and a calculated theoretical speed ramp value exceeds a predetermined slip threshold, and the rear wheel deceleration exceeds a predetermined amount, the dump valve 26 can be selectively opened to reduce the pressure in the line 24 to correct the impending lock-up condition.

In some instances, after an impending lock-up condition has been corrected, it is desirable to reapply additional pressure to the rear brakes to increase braking of the rear wheels. For example, as described in above-identified U.S. Pat. Application Ser. No. 063,361, it has been found desirable to automatically apply additional pressure following the first wheel speed departure cycle to cause a second wheel speed departure. This automatic reapplication of pressure ensures that the maximum controlled pressure is supplied to the rear brake during an anti-lock stop.

Also, after the second wheel speed departure cycle, the system monitors the changes in deceleration of the rear wheels to detect instances wherein the vehicle travels from a road surface such as ice wherein the coefficient of friction (mu) between the vehicle and the road surface is relatively low (low mu surface) to a road surface such as concrete wherein the coefficient of friction between the vehicle and the road surface is relatively high (high mu surface). In these instances, when the vehicle front wheels contact the higher mu surface, the uncontrolled front brakes will cause an increase in the deceleration of the vehicle as the vehicle travels from the low mu surface to the high mu surface. Under these conditions, the pressure held in the line 24 to the rear brakes can generally be increased to provide further braking without causing a lock-up condition of the rear brakes. This is accomplished by momentarily opening the isolation valve 22 to permit the higher pressure fluid in the line 18b to be supplied to the line 24. Due to the continued braking effort by the driver on the vehicle brake pedal under a hard braking condition, the pressure in the line 18b will generally be higher than the pressure in the line 24.

Other reapply modes, such as an end-of-stop reapply mode which automatically reapplies additional pressure at or near the end of a vehicle stop, is described in detail in above-identified U.S. Pat. Application Ser. No. 063,361.

Figure 3A:
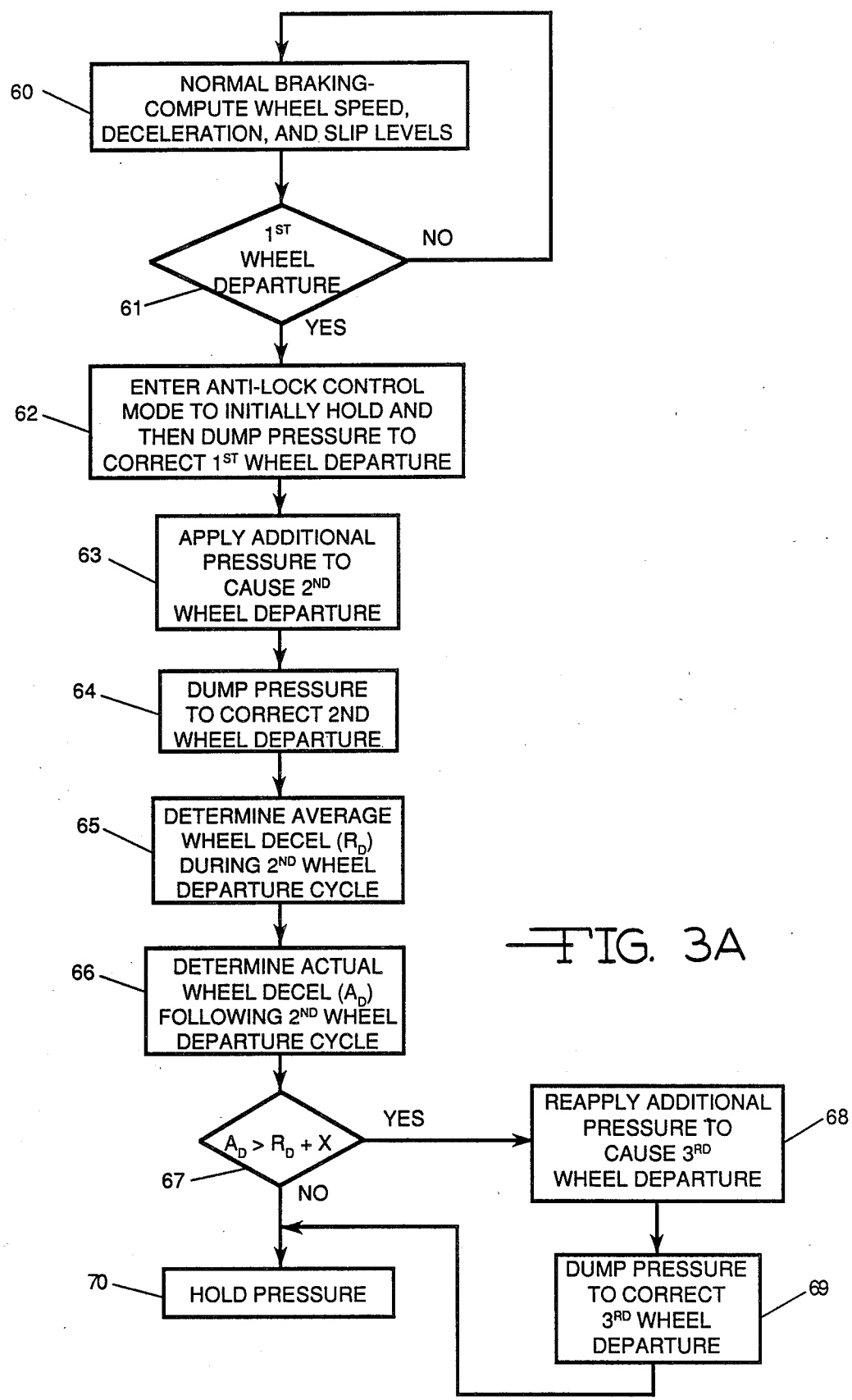
FIGS. 3a and 3b are flow diagrams illustrating the manner in which anti-lock control system of FIG. 1 achieves the operating characteristics shown in FIGS. 2a and 2b.
Figure 3B:
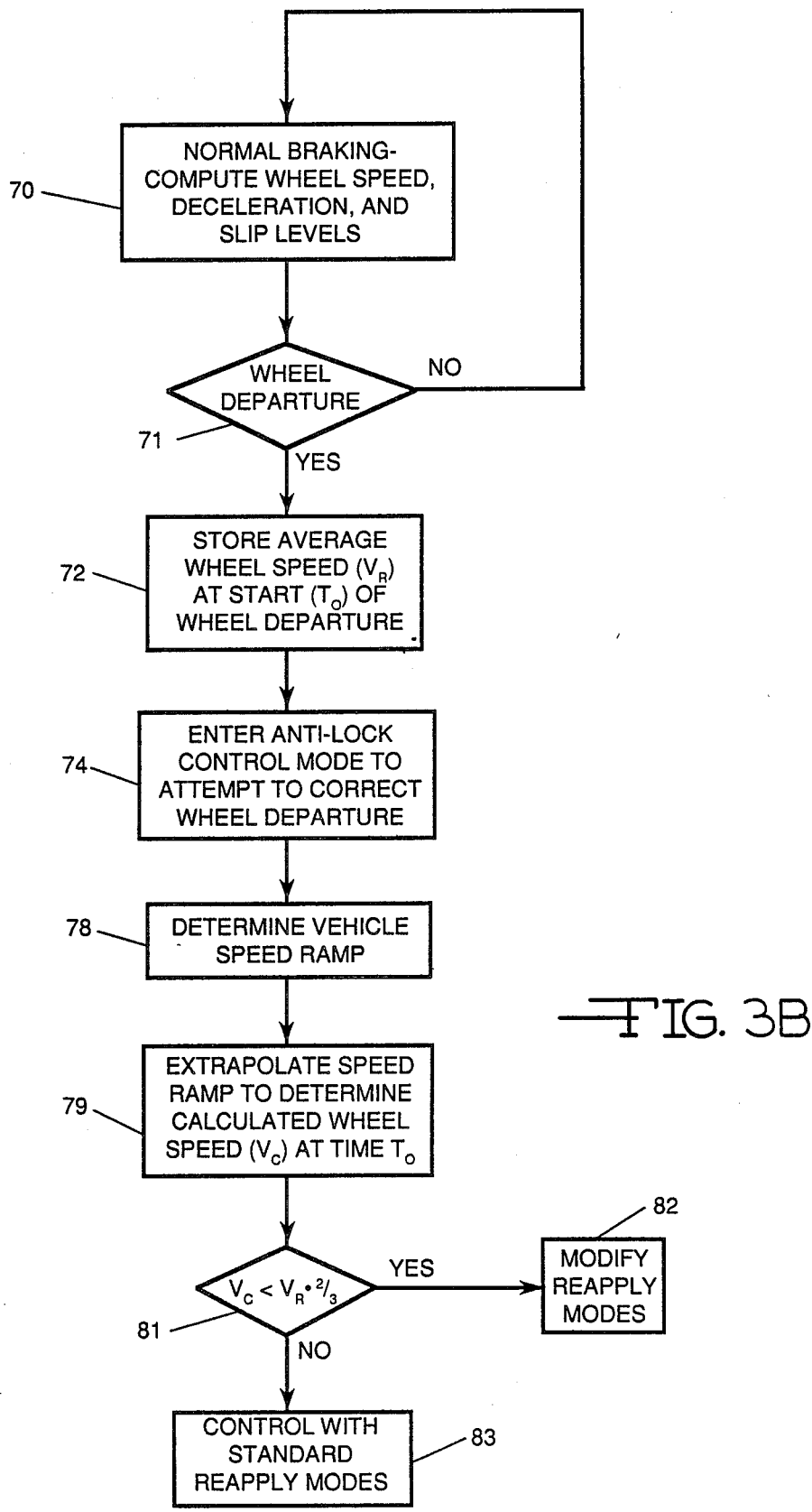

Referring now to FIGS. 2a and 2b, there are shown waveform diagrams which will be utilized to describe the improved operation of the anti-lock system under certain braking situations. In particular, FIG. 2a illustrates the operation of the anti-lock control system as the vehicle egins braking on a relatively low mu surface, enters the anti-lock control mode, and then travels onto a relatively hi mu surface during a second wheel speed departure. FIG. 2b illustrates the operation of the anti-lock system when the vehicle is braked on a split mu or a relatively low mu surface wherein one of the two rear wheels remains locked after anti-lock control measures have been taken. It will be appreciated that the wave form diagrams of FIGS. 2a and 2b and the flow diagrams of FIGS. 3a and 3b represent only a portion of the control features of the anti-lock system, and that a more complete description of the anti-lock system can be found in above-identified U.S. Pat. Application Ser. No. 063,361.

Referring now to FIG. 2a, the actual rear wheel speed is indicated by an upper curve 50, while the actual rear wheel brake pressure is indicated by a lower curve 51. The operation of the isolation valve 22 is represented by the waveform 52, while the operation of the dump valve 26 is represented by the waveform 53. Initially, at time $t_0$, the vehicle is traveling along a relatively low mu surface, such as snow or ice, at a speed $V_T$ without the vehicle brakes applied. At this time, the isolation valve 22 is open while the dump valve 26 is closed. At time $t_1$, the driver initiates a hard vehicle stop by fully depressing the brake pedal to quickly increase the brake pressure in the line 24 and cause the vehicle to decelerate. Initially, the brake pressure in the line 24 is not sufficient to cause any lock-up of the rear wheels. However, shortly after the time $t_1$, the rear wheel speed begins to slip relative to the actual vehicle speed (represented by the dashed curve 55) to cause the rear wheels to enter a first wheel speed departure cycle 50a.

As shown in FIG. 2a, after time $t_1$, the actual wheel speed 50 begins to drop relative to the actual vehicle speed 55, as indicated by portion 50b. Prior to entering the wheel speed departure cycle 50a, the computer control has calculated a theoretical speed ramp (not shown), which represents the speed the vehicle would travel if decelerated at a predetermined maximum rate, for example, 1.0 g. The computer control also continues to monitor the deceleration of rear wheels and the actual speed of the rear wheels relative to the calculated speed ramp value. When the deceleration of the rear wheels reaches a predetermined value (e.g. 1.3 g) at time $t_2$, the computer control generates a signal to close the isolation valve to hold pressure in the line 24 at a constant level $P_a$, while the uncontrolled rear brake pressure follows curve 51a. When the difference between the actual wheel speed 50 and the calculated speed ramp value exceeds a predetermined slip threshold $S_t$, this indicates that a predetermined slippage is occurring between the actual wheel speed and the vehicle speed. In FIG. 2a, the slip threshold $S_t$ is exceeded and the rear wheel deceleration exceeds a predetermined amount at time $t_3$. At this time, the actual wheel speed has fallen sufficiently that it is desirable to selectively reduce the pressure to the rear wheels in an attempt to return the actual wheel speed to the vehicle speed. Thus, the computer control generates one or more dump pulses 53a, beginning at time $t_3$, to selectively reduce the rear brake pressure to a level $P_b$. The particular number of dump pulses generated will vary depending on the particular control valve used, and on the amount of pressure reduction which occurs for each pulse. It will be appreciated that the uniform width and spacing between a series of dump pulses are shown for the sake of simplicity and that, as discussed in U.S. Pat. No. 4,673,226, it may be desirable to control the width and spacing between dump pulses to obtain a desired pressure reduction curve.

Generally, the dump pulses 53a are terminated approximately at a time wherein the actual deceleration of the wheel has fallen below the predetermined amount. After the actual wheel speed "spins up" along portion 50c and returns to the actual speed to complete the first wheel speed departure cycle 50a and correct the slip condition, it has been found desirable to selectively and automatically reapply additional pressure to the rear brakes in order to ensure that the maximum controlled pressure is applied to the rear brakes. As shown in the isolation valve waveform 52, a series of automatic reapply pulses 52a are generated at time $t_4$ after the end of the spin-up portion 50c to selectively increase the rear brake pressure to a level $P_c$. Typically, the number of automatic reapply pulses 52a will vary depending on the particular control valve used. The pulses 52a are generated until a second wheel speed departure cycle 50e is initiated. As was the case with the dump pulses, the width and spacing between successive reapply pulses can be varied to control the pressure application curve. Once the slip threshold has been exceeded in the second wheel speed departure cycle, one or more dump pulses 53b are generated (at time $t_5$) to correct the slip condition and reduce the rear brake pressure to a level $P_d$. Thereafter, as long as the uncontrolled pressure 51a supplied by the vehicle driver is above the pressure $P_d$, the anti-lock system will maintain the pressure at the level $P_d$ as long as the road surface friction remains relatively constant. Typically, the pressure $P_d$ will be greater than the pressure $P_b$.

In FIG. 2a, the vehicle travels from a low mu surface to a high mu surface during the second wheel speed departure cycle 50e at a time $t_6$. The present invention is specifically concerned with a computer control which can detect such a change in rad surface conditions during a wheel speed departure cycle. In accordance with the present invention, such a change is detected by first computing the average wheel deceleration during the time period of the second wheel speed departure cycle 50e which, in FIG. 2a, is represented by the time period $T_{R1}$. By measuring this time period, and by sensing the rear wheel speed $V_{R1}$ and $V_{R2}$ at the beginning and end of the time period $T_{R1}$, the average deceleration can be calculated by determining the difference between $V_{R1}$ and $V_{R2}$ and dividing this difference by the time period $T_{R1}$. Thereafter, the computer control is operable to measure the rear wheel deceleration over a second time period $T_{R2}$ immediately following the time period $T_{R1}$. The average wheel deceleration during the time period $T_{R2}$ can be calculated in a similar manner by utilizing the rear wheel speed values $V_{R2}$ and $V_{R3}$ at the beginning and end of the time period $T_{R2}$. If it is determined that the average wheel deceleration during the time period $T_{R2}$ is greater than the average wheel deceleration during the time $T_{R1}$ by a predetermined amount, this indicates a situation wherein it is likely that the vehicle has traveled from a low mu to a high mu surface during the second wheel speed departure cycle 50e. As previously mentioned, this increase in deceleration is due to the increased braking provided by the front wheels when the vehicle travels onto the higher mu surface. In these instances, the brake pressure to the rear wheels can generally be increased without causing lock-up of the rear brakes. Accordingly, at time $t_7$, the computer control will generate additional reapply pulses 52b to increase pressure to a level $P_e$ and cause a third wheel speed departure cycle at 50f. The control then generates one or more dump pulses 53c at time t₈ to reduce pressure to a level $P_f$ and correct the third wheel speed departure. In the event the low to high mu surface change would occur subsequent to the end of the second wheel speed departure 50e, such a change in road surface conditions can be detected in a manner as described in above-mentioned U.S. Pat. Application Ser. No. 063,361.

Referring now to FIG. 3a, there is shown a simplified flow diagram which can be utilized to summarize the operation of the anti-lock system as illustrated in FIG. 2a. In FIG. 3a, a processing function 60 represents "normal" braking conditions under which the anti-lock brake system has not been activated and the vehicle brake pressure is under full control of the vehicle driver. During such braking conditions, the anti-lock system of the present invention continues to monitor the average rear wheel speed and calculate the deceleration and slip level and compare these values to predetermined anti-lock actuation thresholds. This comparison function is represented by a decision point 61 wherein, if no wheel speed departure has been detected, the system branches at NO and remains in a normal braking mode. However, in the event a first wheel departure has been detected, the system branches at YES and enters a processing function 62 wherein the anti-lock control mode is activated. At this point, the isolation valve 22 is closed (at time t₂) to initially hold pressure at the level $P_a$, and then the normally closed dump valve 26 is selectively opened (at time t₃) to selectively reduce pressure to the level $P_b$ and correct the first wheel speed departure. From this point, the program enters a processing function 63 wherein, at time t₄, additional pressure is applied via the reapply pulses 52a to increase pressure to the level $P_c$ and cause the second wheel speed departure 50e. Next, a processing function 64 is executed wherein the dump valve is actuated via the dump pulse 53b to selectively reduce pressure to the level $P_d$, thereby correcting the second wheel speed departure.

After the second wheel speed departure has been corrected, the program enters a processing function at 65 wherein the average wheel deceleration ($R_D$) which occurs during the second wheel departure cycle (time period $T_{R1}$) is calculated. Next, the program enters a processing function at 66 and calculates the average wheel deceleration ($A_D$) over a second predetermined time period $T_{R2}$ immediately following the time period $T_{R1}$. The average wheel deceleration $R_D$ is then compared with the average wheel deceleration $A_D$ in a decision point 66. If the wheel deceleration $A_D$ is greater than the reference wheel deceleration by a predetermined amount (X), this indicates a situation where it is likely that the vehicle has traveled from a low mu surface to a high mu surface during the second wheel speed departure. The program then branches at YES and enters a processing function 68 wherein the additional reapply pulses 52b are generated to increase pressure to a level Pe and cause the third wheel departure 50f. The third wheel departure is then corrected in processing function 69 by generating one or more dump pulses 53c to reduce the pressure to a level $P_f$ and correct the third wheel departure. From this point, or if the wheel deceleration $A_D$ is not greater than the reference wheel deceleration by a predetermined amount, the program enters a processing function 70 which maintains the rear brake pressure at a relatively constant level unless predetermined operating parameters are met as described in U.S. Pat. Application Ser. No. 063,361, which would necessitate additional pressure control to the rear brakes.

The present invention also concerns a unique approach for determining if one of the two rear wheels of the vehicle remains locked after anti-lock control measures have attempted to correct a wheel speed departure. This particular feature of the present invention is especially desirable in anti-lock control systems wherein a single speed sensor is utilized to provide a speed signal which indicates the average speed between two or more wheels of a vehicle. This is commonly the case in rear wheel drive vehicles wherein a center rear differential is utilized to divide torque between the left and right rear wheels of the vehicle. In these situations, a single speed sensor, as shown in FIG. 1, is used to monitor the speed of a component of the differential which rotates at the average speed of the two rear wheels.

It has been found that in some braking conditions, particularly when braking the vehicle on a relatively low mu surface, or when braking the vehicle on a split mu surface having a relatively low mu surface located on one side of the vehicle, and a relatively high mu surface on the other side of the vehicle, that correcting the wheel slip condition of a locked wheel can be difficult. However, in these situations, if it can be detected that one of the rear wheels has remained locked after the anti-lock control has attempted to correct the wheel departure, steps can be taken to assist in freeing up the locked wheel. For example, in accordance with the present invention, when it has been determined that one of the rear wheels remains locked after an attempt to correct a wheel speed departure, the normally standard predetermined operating parameters which can cause additional pressure to be applied to the rear brakes are modified such that no additional reapply pulses, or a lesser number of reapply pulses, are subsequently generated. Further, it has been found desirable to modify the end-of-stop routine described in the above-referenced U.S. Pat. Application Ser. No. 063,361 such that the end-of-stop speed ramp would decay at half of its normal rate.

Referring now to FIG. 2b and FIG. 3b, the manner in which the present invention detects such a locked rear wheel will now be discussed. As shown in FIG. 3b, a processing function 70 represents "normal" braking conditions under which the anti-lock system has not been activated and the vehicle brake pressure is under full control of the vehicle driver. During such braking conditions, the anti-lock system of the present invention continues to monitor the average rear wheel speed and calculate the deceleration and slip level to determine whether a wheel speed departure condition is present necessitating the need for the system to enter the anti-lock mode. More specifically, if a wheel departure is detected in a decision point 71, the program branches at YES and enters a processing function 72 wherein the average rear wheel speed ($V_R$) at the start (time $T_o$) of a wheel departure 73, shown in FIG. 2b, is stored. Next, the program enters a processing function 74 wherein the anti-lock control mode is activated in an attempt to correct the wheel departure 73. However, since one of the rear wheels remains locked, the average rear wheel speed is stabilized along a ramp 75 which is midway between a vehicle speed curve 76 and a zero speed level 77. In this situation, one of the rear wheels is rolling at vehicle speed, while the other rear wheel is locked.

In order to detect such a condition, the program enters a processing function 78 wherein a vehicle speed ramp is determined over a predetermined time period T as shown in FIG. 2b. Next, a processing function 79 is executed wherein the speed ramp is extrapolated backwards (as shown in FIG. 2b by a dashed line 80) to determine a calculated wheel speed ($V_C$) at time $T_0$. This calculated vehicle speed is then compared (in a decision point 81) with a predetermined percentage of the average wheel reference speed $V_R$. In FIG. 2b, this percentage is shown as ⅔ of the reference speed $V_R$. In the event the calculated speed is less than ⅔ of the reference speed, this is an indication that one of the two rear wheels is locked or at least partially locked. In these instances, it has been found desirable to modify any further reapply modes. Thus, the program branches from the decision point 81 at YES and enters a processing function 82 wherein the predetermined operating parameters which control the reapply modes are modified as indicated above. However, in the event the calculated speed is above ⅔ of the reference speed, the program branches at NO and enters a processing function 83 wherein anti-lock control is continued with the standard operating parameters for the reapply modes.

The anti-lock control system of the present invention has been illustrated and described in a manner which is considered to represent its preferred embodiment. However, it will be appreciated that the features and operation of the present invention can be modified without departing from the spirit or scope of the attached claims. For example, while the control system has been described for use in conjunction with a pumpless anti-lock brake system for controlling only the rear wheels of a vehicle, the above described operating features or portions thereof can be incorporated into an anti-lock system which includes a hydraulic pump and is adapted to control the brake pressure to all four wheels of the vehicle.

WHAT IS CLAIMED IS:

1. In a wheeled vehicle having means for supplying pressurized brake fluid to actuate the associated wheel brakes of the vehicle, a brake control system for controlling the application of pressurized brake fluid to at least one selected wheel brake to control the braking of the associated wheel, said control system comprising:
   a normally open isolation valve means connected between the supply means and the selected wheel brake;
   a normally closed dump valve means connected between the selected wheel brake and a fluid reservoir; and
   control means connected to operate said isolation valve means and said dump valve means, said control means including means for sensing the deceleration of the associated wheel and for detecting wheel speed departures of the associated wheel relative to the actual speed of the vehicle, said control means operable to close said isolation valve means to hold the fluid pressure to the selected wheel brake at a relatively constant level after a wheel speed departure of the associated wheel is detected, said control means operable to selectively open said dump valve means after said isolation valve means has been closed to enable fluid to flow into said fluid reservoir to selectively reduce pressure to the selected wheel brake and correct said wheel speed departure of the associated wheel, said control means operable to determine a reference deceleration value representing the average wheel deceleration during a cycle of said wheel speed departure, said control means further operable to reapply additional pressure to the selected brake in the event the actual average wheel deceleration over a predetermined time period following said cycle is greater than said reference deceleration value by a predetermined amount.

2. The control system according to claim 1 wherein said wheel speed departure is a second wheel speed departure and wherein, prior to said second wheel speed departure, a first wheel speed departure of the associated wheel occurs and said control means is operable to close said isolation valve means to hold the fluid pressure to the selected wheel brake at a relatively constant level after said first wheel speed departure is detected, and said control means is then operable to selectively open said dump valve means after said isolation valve means has been closed during said first wheel speed departure to enable fluid to flow into said fluid reservoir to selectively reduce fluid pressure to the selected wheel brake and correct said first wheel speed departure, said control means operable to selectively open said isolation valve means after said first wheel speed departure is corrected to selectively increase pressure to cause said second wheel speed departure.

3. The control system according to claim 2 wherein said control means reapplies additional pressure after said second wheel speed departure has been corrected to cause a third wheel speed departure, and wherein said control means selectively opens said dump valve means to reduce fluid pressure to correct said third wheel speed departure.

4. The control system according to claim 1 wherein said control means is operable to determine said reference deceleration value as a function of a first vehicle speed value representing the speed of the associated wheel immediately prior to said wheel speed departure cycle and a second vehicle speed value representing the speed of the associated wheel immediately after said wheel speed departure cycle.

5. The control system according to claim 1 wherein said predetermined time period commences at the end of said cycle.

6. In a wheeled vehicle having means for supplying pressurized brake fluid to actuate the associated wheel brakes of the vehicle, a brake control system for controlling the application of pressurized brake fluid to at least two selected wheel brakes to control the braking of at least two associated selected wheels, said control system comprising:
   a normally open isolation valve means connected between the supply means and the selected wheel brake;
   a normally closed dump valve means connected between the selected wheel brake and a fluid reservoir;
   speed sensor means for generating a signal representing the average speed of the selected wheels; and
   control means connected to operate said isolation valve means and said dump valve means, said control means including means for detecting wheel speed departures of the selected wheels relative to the actual speed of the vehicle, said control means operable to close said isolation valve means to hold the fluid pressure to the selected wheel brakes at a relatively constant level after a wheel speed departure of the associated wheels is detected, said control means operable to selectively open said dump valve means after said isolation valve means has been closed to enable fluid to flow into said fluid reservoir to selectively reduce fluid pressure to the selected wheel brakes an attempt to correct said wheel speed departure, said control means responsive to a predetermined set of operating parameters for selectively opening said isolation valve means after said wheel speed departure has been corrected to selectively increase pressure to the wheel brakes, said control means including means for determining when at least one of said selected wheel brakes remains at least partially locked after the attempt to correct said wheel speed departure, said control means operable to modify said predetermined set of operating parameters in the event at least one of said selected wheel brakes remains at least partially locked.

7. The control system according to claim 6 wherein said control means includes means for determining the actual speed of the vehicle, and said control means determines when at least one of said selected wheel brakes remains at least partially locked by comparing the average speed of the selected wheels with the actual speed of the vehicle.

8. The control system according to claim 6 wherein said control means determines an actual average wheel speed of the selected wheels at a predetermined time immediately prior to said wheel speed departure and thus determines a wheel speed ramp over a predetermined time period after said wheel speed departure is apparently corrected, and wherein said control means is operable to extrapolate said wheel speed ramp backwards to said predetermined time to determine a calculated average wheel speed at said predetermined time, said control means operable to modify said predetermined set of operating parameters in the event said calculated average wheel speed is less than said actual average wheel speed by a predetermined amount.

9. The control system according to claim 6 wherein said speed sensor means is a single speed sensor.

10. In a wheeled vehicle having means for supplying pressurized brake fluid to actuate the associated wheel brakes of the vehicle, a brake control system for controlling the application of pressurized brake fluid to at least two selected wheel brakes to control the braking of at least two associated selected wheels, said control system comprising:

valve means connected between the supply means and the selected wheel brakes;

speed sensor means for generating a signal representing the average speed of the selected wheels; and control means connected to operate said valve means, said control means including means for detecting wheel speed departures of the selected wheels relative to the actual speed of the vehicle, said control means operable to actuate said valve means to selectively reduce fluid pressure to the selected wheel brakes and attempt to correct said wheel speed departure, said control means responsive to a predetermined set of operating parameters for actuating said valve means after said wheel speed departure has been corrected to selectively increase pressure to the selected wheel brakes, said control means including means for determining when at least one of said selected wheel brakes remains partially locked after the attempt to correct said wheel speed departure, said control means operable to modify said predetermined set of operating parameters in the event at least one of said selected wheel brakes remains at least partially locked.

11. The control system according to claim 10 wherein said control means includes means for determining the actual speed of the vehicle, and said control means determines when at least one of said selected wheel brakes remains at least partially locked by comparing the average speed of the selected wheels with the actual speed of the vehicle.

12. The control system according to claim 10 wherein said control means determines an actual average wheel speed of the selected wheels at a predetermined time immediately prior to said wheel speed departure and thus determines a wheel speed ramp over a predetermined time period after said wheel speed departure is apparently corrected, and wherein said control means is operable to extrapolate said speed ramp backwards to said predetermined time to determine a calculated average wheel speed at said predetermined time, said control means operable to modify said predetermined set of operating parameters in the event said calculated average wheel speed is less than said actual average wheel speed by a predetermined amount.

13. The control system according to claim 10 wherein said speed sensor means is a single speed sensor.

* * * * *